W. LEWIS.
JAR MOLDING MACHINE.
APPLICATION FILED JAN. 8, 1910.
1,033,812.
Patented July 30, 1912.
3 SHEETS—SHEET 3.
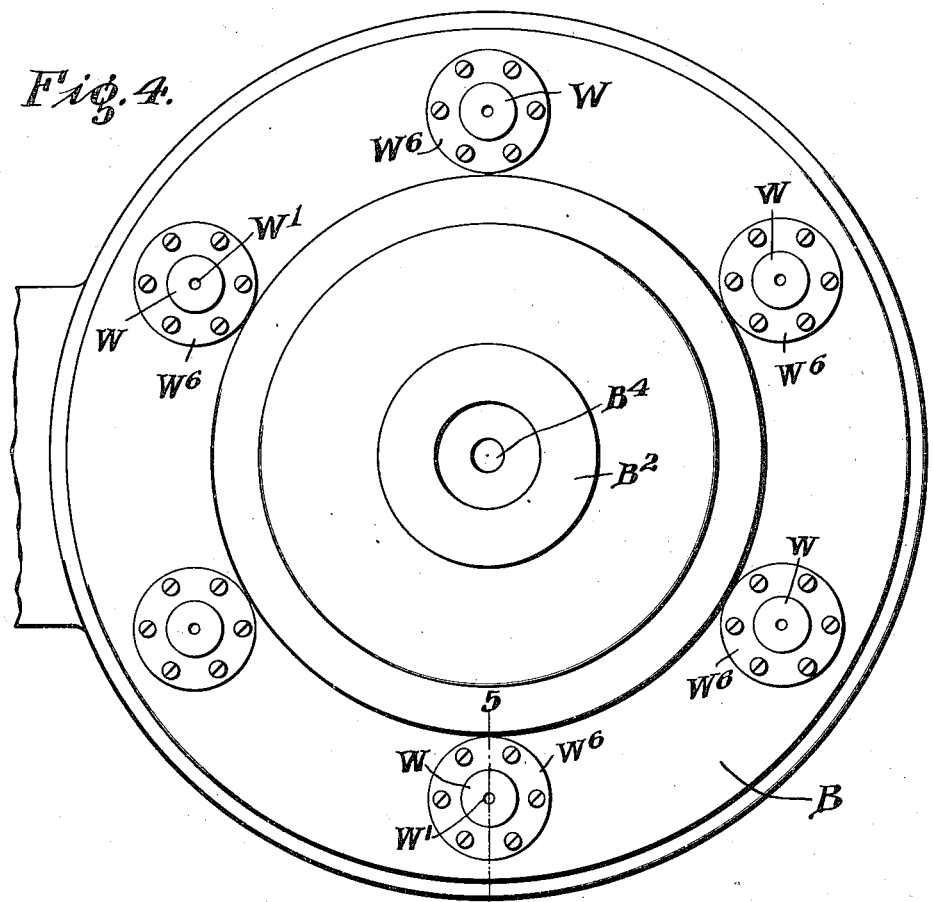
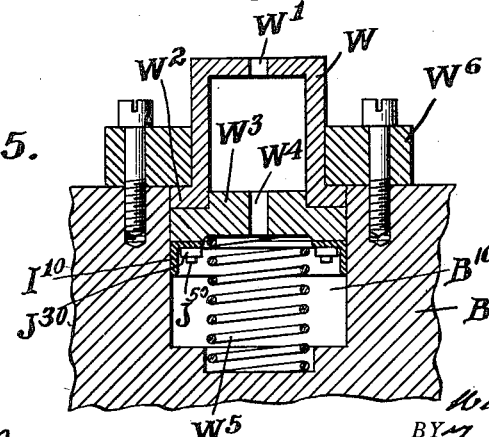

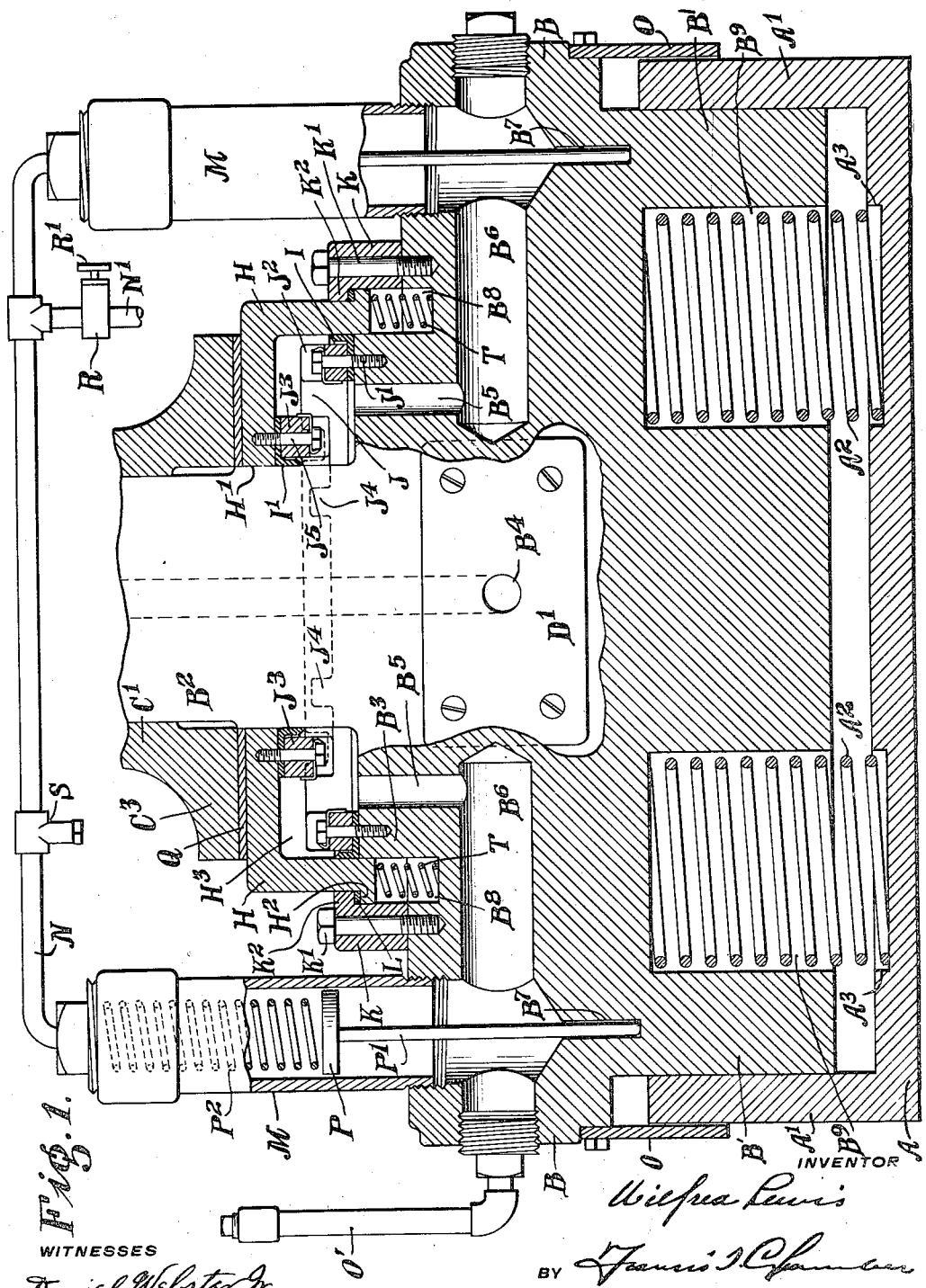

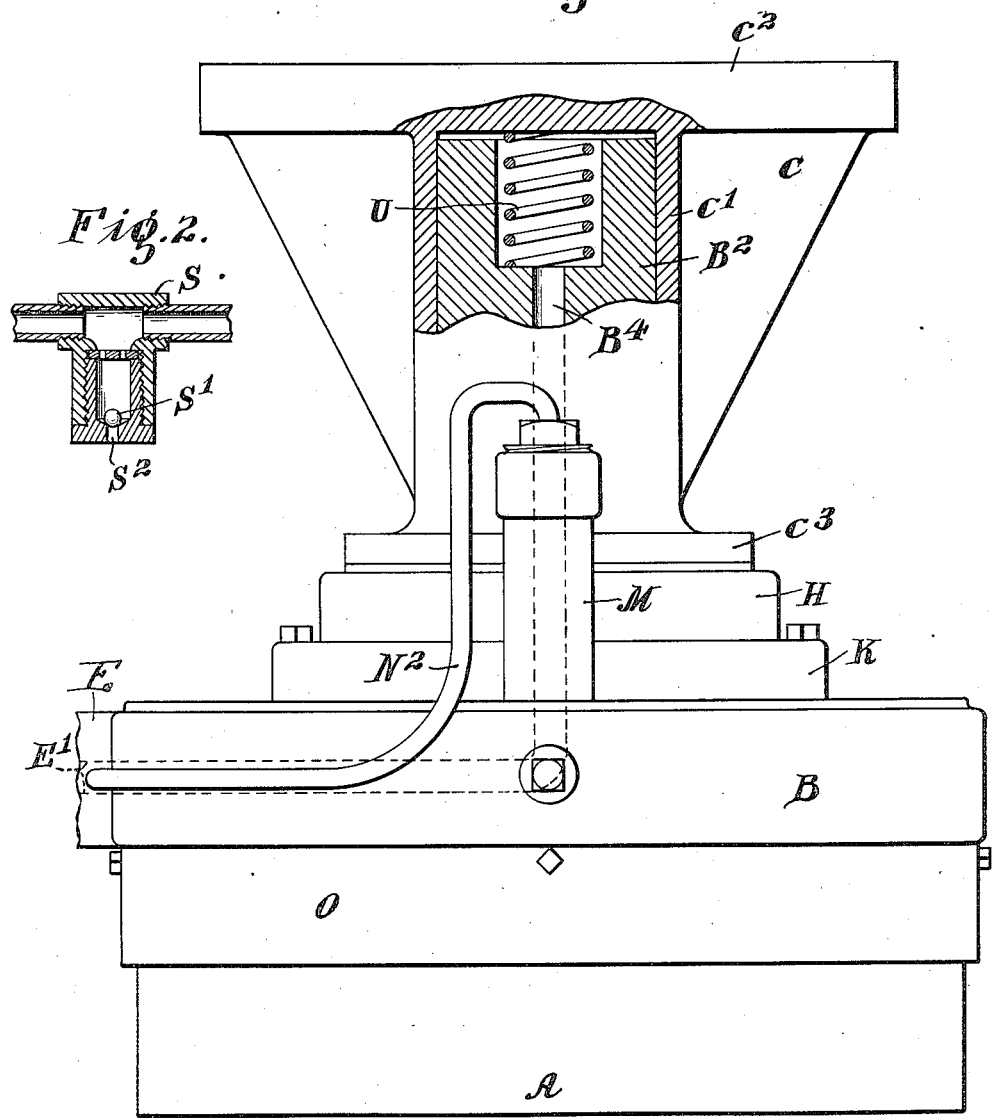

UNITED STATES PATENT OFFICE.

WILFRED LEWIS, OF PHILADELPHIA, PENNSYLVANIA, ASSIGNOR, BY MESNE ASSIGN-
MENTS, TO THE TABOR MANUFACTURING COMPANY, OF PHILADELPHIA, PENN-
SYLVANIA, A CORPORATION OF PENNSYLVANIA.

JAR MOLDING-MACHINE.

1,033,812.     Specification of Letters Patent.     Patented July 30, 1912.

Application filed January 8, 1910. Serial No. 536,981.

*To all whom it may concern:*

Be it known that I, WILFRED LEWIS, a citizen of the United States of America, residing in the city and county of Philadelphia, in the State of Pennsylvania, have invented a certain new and useful Improvement in Jar Molding-Machines, of which the following is a true and exact description, reference being had to the accompanying drawings, which form a part thereof.

My present invention relates to jar molding machines of the kind in which a relatively movable mold support and anvil are employed, and the sand or other mold forming material is compacted about the pattern or patterns by alternately separating the mold support from the anvil and then causing them to collide—the shock or jar produced by the collision of the mold support and anvil settling the sand about the pattern. Molding machines of this type, in which the collision is brought about by first lifting the mold support, with the flask, pattern or patterns and loose sand mounted thereon, above the anvil and then allowing the mold support to fall until it strikes the anvil, are now in extensive use and form very satisfactory and efficient machines for forming molds. Heretofore some difficulty has been experienced with such machines, however, because of the rebound of the pattern, flask and mold forming material off the mold support after impact, this rebound being due to the elasticity of the impinging bodies. The impinging portions of the mold support and anvil are in practice always formed of metal and usually these portions are of relatively large mass and under static conditions are quite rigid. Their inherent elasticity, when acted upon by the very large forces of impact on collision is sufficient, however, to cause a rebound of the parts supported by the mold support which sometimes interferes with the effectiveness of the machine and produces relative movements between the flask and the patterns to an extent which sometimes is sufficient to make the molds formed seriously defective.

The object of the present invention is the provision in a molding machine of the kind specified, of means for preventing any appreciable rebound of the patterns, flask, etc., supported by the mold support following collision. This I accomplish by providing a yielding but substantially non-resilient cushion between the mold support and anvil to take the shock of collision.

In carrying out my invention I obtain my non-resilient cushion by placing between the anvil and mold support members one or more compressible containers, each of which is filled with a liquid such as water or other fluid relatively non-elastic in comparison with a gas. The container, or each of them where a plurality of containers is employed, is provided with one or more restricted escape ports through which the liquid or non-elastic fluid may pass out of the container at a regulated rate to permit the container to be compressed. With such an arrangement, when the anvil and mold support members come together and put the container or containers under pressure, the latter begin to collapse with a velocity of approach between the engaged ends, which, disregarding the mass of the movable portion of the container, in practice a negligible factor, is the same as the velocity of approach of the anvil and mold support members at the instant the container or containers are engaged between these members. To accommodate this compression of the container or containers the liquid therein must be forced out through the escape ports at a very rapid rate. Owing to the restricted character of the escape ports this results in the creation of a very high fluid pressure within the container or containers. The pressure in the container or containers thus created causes the container or containers to exert a retarding force opposing the movement of approach of the mold support and anvil members which quickly stops such movement. The extent of the movement of the impinging member, after impingement commences, and the consequent amount of compression of the container or containers is thus regulated by the rate at which the liquid escapes from the container and of course depends upon the momentum to be destroyed and the cross sectional area of the liquid space in the container. In practice this movement is small, usually only a small fraction of an inch.

As the velocity of the impinging member falls, the pressure in the container falls also, since the liquid then escapes at a slower rate and at the instant at which the engaged surface of the container ceases to move in the direction in which the impinging body moved prior to impingement, the pressure in the container due to the compression of the latter falls to zero. In consequence, the container then exerts no force against the impinging body tending to move the latter in the reverse direction. The container thus acts in a manner which is directly opposite to that in which a resilient cushion or body acts when impinged against by another body, for in the case of impingement between elastic bodies the pressure between the bodies becomes a maximum at the instant at which the relative velocity of approach between the two bodies is destroyed. This is due to the distortion of the bodies, and it is this pressure, continued, though diminishing, until the bodies are returned to their original form, and separate, which produces the rebound following collision of elastic bodies.

The various features of novelty which characterize my invention are pointed out with particularity in the claims annexed to and forming a part of this specification. For a better understanding of the invention, however, and the advantages possessed by it, reference may be had to the accompanying drawings and descriptive matter in which I have illustrated and described in detail one of the forms in which my invention may be embodied.

Of the drawings, Figure 1 is a sectional elevation of a portion of a molding machine embodying one form of my invention. Fig. 2 is a sectional elevation of a valve employed with the mechanism shown in Fig. 1. Fig. 3 is an elevation of a molding machine which in most respects is identical with that shown in Fig. 1, but has different provisions for expanding the compressible container. Fig. 4 is a plan view of a molding machine, with the mold support removed, in which the means for obtaining a non-resilient cushion between the mold support and anvil are different from those shown in Figs. 1 and 3, and Fig. 5 is a partial sectional elevation on the line 5—5 of Fig. 4.

Referring to the drawings, A represents a bottom member provided with an upstanding cylinder $A'$ which receives a piston extension $B'$ from the underside of the anvil, or impact receiving base member B. The latter is supported on a resilient cushion comprising, in the form shown, a plurality of springs $A^2$, the ends of which are received in sockets $A^3$ and $B^9$, respectively, formed in the adjacent portions of the base and anvil members A and B.

O represents a sand guard secured to the anvil B and telescoping with the cylinder $A'$. The anvil member is provided at its upper end with an upstanding piston $B^2$ surrounded at its base by a cylindrical shoulder $B^3$. The mold support C comprises a cylinder portion $C'$ fitting on the piston $B^2$ and a mold table $C^2$ at the upper end of the cylinder $C'$. The lower end of the cylinder $C'$ terminates in a flanged striking portion $C^3$. In the form of the apparatus disclosed, the mold support C is alternately moved away from the anvil and allowed to return into engagement with the anvil, or more properly, the cushion hereinafter described by the admission to the space in the cylinder $C'$ above the piston $B^2$ through a port $B^4$ of a fluid such as air under pressure and the exhaust of this fluid. This admission and exhaust may be controlled in a known manner either manually or automatically by any suitable valve mechanism. The valve mechanism disclosed and claimed in my copending application, Serial No. 530,343, filed Nov. 29, 1909, may be employed with advantage, but as the character of the valve mechanism employed does not affect the present invention, I have not thought it necessary to illustrate any valve mechanism herein.

The non-resilient cushion, which is the subject of the present invention, is formed, in the construction illustrated in Fig. 1, by a cylinder member H which fits over the shoulder $B^3$, the latter serving as a plunger piston. The upper end of the cylinder H is apertured at $H'$ to receive the piston $B^2$. A packing I, in the form of a cup leather of known form is secured to the shoulder $B^3$ to make a tight joint between it and the cylinder H by suitable means, which in the form shown comprise an annular ring J and bolts $J'$. The bolts $J'$ are tapped into the end of the shoulder $B^3$ and the heads of the bolts are received in notches $J^2$ formed in the upper end of the ring J. Similarly, a cup leather $I'$, a ring $J^3$, having notches $J^4$, and bolts $J^5$ tapped into the cylinder member H, are provided for making a tight joint between the piston $B^2$ and the cylinder H. The movement of the cylinder H away from the anvil B is limited by a collar K secured to the body of the anvil member B by bolts $K'$ and provided with a flange $K^2$ at its inner edge which overlaps a flange $H^2$ at the outer end of the lower edge of the cylinder H. A plurality of relatively long springs T entering sockets $B^8$ in the anvil may be provided to bear against the lower edge of the member H and tend to hold the latter in the position shown in Fig. 1. A cushioning or deadening washer L of leather or like material may be placed between the shoulders $H^2$ and $K^2$. In the construction described, the shoulder or plunger piston $B^3$ and the cylinder H form the compressible container of the non-resilient cushion and the space in this container is connected by one or more (in the form shown, two) escape ports B⁵, of predetermined lengths and diameters, to corresponding radial chambers B⁶ of substantially greater cross sectional area than the ports B⁵. The chambers B⁶, in the form shown, each communicates with a corresponding vertical cylinder M. A filling pipe O' is connected to the anvil B through which liquid is admitted to the chambers B⁶ to initially supply or to replenish the liquid as needed. To retard the upward movement of the cylinder H under certain conditions, as hereinafter described, a piston P may be placed in each cylinder M and arranged to permit a substantial leakage past it. As shown, each piston P is of an external diameter slightly less than the external diameter of the cylinder in which it is placed, and is guided by means of a stem P' loosely entering a corresponding guide chamber B⁷ formed in the anvil member B. Between the upper end of each cylinder M and the corresponding piston P is placed a spring P² which normally holds the piston P at the lower limit of its movement as shown. In Fig. 1 the tops of the two reservoirs M are connected by a pipe N.

N' represents a branch pipe connecting the pipe N to a source of fluid under pressure as for instance the supply system for furnishing compressed air or other fluid for reciprocating the mold support on the piston B³. The pipe N' is controlled by a valve R. The latter may advantageously be an automatic pressure reducing valve of any well known type which may be regulated by the knob R' to cause it to close at any desired pressure on its outlet side up to the maximum pressure on its inlet side, or which may be closed entirely by the knob R' regardless of the pressure on its inlet and outlet sides.

S represents a check valve, the valve S' proper of which opens the port S² to permit air to pass into pipe N when the pressure therein falls below the pressure of the atmosphere, but closes to prevent the flow of air from pipe N out through port S².

The purpose of the springs T and the piping N and N', is to insure that at the instant impact begins the cylinder H is in its uppermost position as shown in Fig. 1. The return of the cylinder to this position after impact may be brought about by the springs T alone, the piping, or at least the pipe N', being either dispensed with, or what amounts to the same thing, the valve R being positively closed. Even when the valve R is closed or pipe N' dispensed with, the pipe N is useful in equalizing the pressure in reservoirs M when the cylinder H is depressed. The air trapped in the upper ends of the reservoirs M and the pipe N under such conditions and put under pressure forced into the reservoirs by the downward movement of the cylinder supplements the action of the springs T in returning cylinder H. When the valve R admits air of the proper pressure to pipe N the springs may also be dispensed with. The effect of the springs T, or of the air pressure on the liquid in reservoir M, or both, as the case may be, must be great enough to get the member H into its uppermost position at least as soon as impact begins. The lifting effect on member H may well be sufficient to support, or more than support, the static weight of the cylinder H, mold support, and load carried by the latter, in which case Fig. 1 shows the normally at rest condition of the apparatus, or it may be insufficient for this purpose, but in the latter case it must be sufficient at least to move the cylinder H from its lower to its upper position while the mold support is making one rising and falling movement.

Where the lifting effect on the cylinder H is relatively large the pistons P which lift to permit liquid to flow with freedom into reservoir M from the passages B⁶ and are then quickly returned to their normal position shown in Fig. 1 and thereafter, since the downward flow past them is restricted, operate to check the flow of fluid from reservoirs M and retard the final portion at least of the upward movement of the cylinder H, thereby avoiding any tendency to the production of a rebound by the rise of the cylinder H. Where the lifting effect is not so large the pistons P' have little effect on the operation of the apparatus and in practice these pistons may usually be dispensed with.

In operation when the mold support, after being lifted the desired distance, falls into engagement with the cylinder H the latter is moved down relative to the anvil. The downward movement of the latter relative to the anvil is resisted by the liquid which must escape through the restricted ports B⁵ to permit such movement, the cushion device being thus in effect a special form of fluid dash interposed between the mold support and the impact receiving base or anvil member proper. The rate of flow through the ports B⁵ depends of course on the pressure in space H³, and in consequence the pressure in the space H³ depends on the velocity of the cylinder H relative to the anvil. At the instant impact begins the cylinder H starts to move down with the full velocity acquired by the mold support in falling. This creates an enormous pressure in the chamber H³ and this pressure of course reacts on the cylinder H to check its downward velocity and that of the mold support. As the downward velocity of the cylinder decreases the pressure falls and when the velocity of the cylinder is entirely checked, the pressure in the cylinder space H³ due to the restriction of the escape ports falls to zero, though of course the liquid in the chamber H³ may still be under some actual pressure produced by the air pressure in the upper ends of the reservoirs M. This remaining pressure will at a maximum hardly exceed a hundred pounds, or thereabout, to the square inch, and may be substantially less than this. In any event, the pressure in the cylinder space $H^3$, at the end of the downward movement of the cylinder H, will be negligible in comparison with the maximum pressure in the cylinder space $H^3$. The latter need be limited only by the strength of the ports and in practice I prefer that the apparatus should be designed for a maximum pressure of between one and two thousand pounds per square inch and, desirably, but little below the higher amount. In so far as the cushion effect of the cylinder H and its liquid support is due to the pressure of the latter created by the restriction of ports $B^5$ is concerned, the cushion acts in a manner directly contrary to the way in which a resilient cushion acts, as previously explained. The effect of the springs T, air pressure in reservoirs M, etc. on the cylinder H is to make the latter act as if it formed part of a resilient cushion, but this resilient effect is negligible in comparison with the non-resilient component of the cushion action.

The rings J and $J^3$ serve as safety devices to take the impact of collision between the mold support and anvil when for any cause the space $H^3$ is not filled with liquid. A washer Q, of leather or like material, may be placed on the upper end of the cylinder H to deaden the noise of collision and reduce the upsetting effect of collision on the anvil and mold support. In the particular construction described the anvil is a floating anvil which is given a positive upward movement when the weight of the mold support and its load is taken off the anvil, by connecting the space in the cylinder $C'$ to exhaust after the parts have been separated. In consequence, on collision, the momentums of the mold support and its load and that of the anvil are equal in amount and opposite in direction and hence mutually destroy one another and thus avoid any injurious transfer of the shock of collision to the base of the molding machine or the foundation on which it is supported. This feature of construction and arrangement, while an important one and novel with me, is not claimed herein, as it forms the subject matter of my Patent 941,999, granted November 30, 1909. Moreover, so far as the invention claimed herein is concerned, it is quite immaterial whether the relative movement of approach of the mold support and anvil is brought about by the absolute movement of one or the other of these members alone, or by absolute movements of both members.

The machine shown in Fig. 3 is like that shown in Fig. 1 except that the tops of reservoirs M are connected by pipes $N^2$ to the port $B^4$ or rather to port $E'$ of the valve E which communicates with the port $B^4$. In consequence, when the pressure fluid is admitted to port $B^4$ to lift the mold support, the pressure is transmitted to the liquid in cylinder space $H^3$ to lift the cylinder H and when the pressure in port $B^4$ falls, and while impact is taking place, the pressure in space $H^3$ is purely that due to the restriction of the escape ports $B^5$, provided the springs T are omitted as they ordinarily would be with this arrangement. Theoretically, the non-resiliency, so to speak, of the cushion is greater with the arrangement of Fig. 3 than with that of Fig. 1, but practically there is no material difference, and the arrangement of Fig. 3 possesses the disadvantage of using up pressure fluid.

It should be explained that with any of the arrangements described the actual movement of the cylinder H relative to the anvil is small, of the order of an eighth of an inch or so. The time in which the cylinder completes its downward stroke is very short and only a small fraction of the time interval between collisions.

In either of the arrangements already described, as well as in the one yet to be described, a spring U extending between the piston $B^2$ and the mold support may well be employed to slightly retard the falling movement of the mold support. I have found that the provision of means, such as the spring U, for making the downward acceleration of the mold support somewhat less than that which it would have been if it fell freely, is advantageous as it causes the mold forming material to bear more firmly against the patterns, insuring better molds.

From constructional reasons I find it an advantage to make the portions of the piston $B^2$ surrounded by the cylinder H slightly greater in diameter than the upper portion of the piston. This facilitates the operation of getting the packing ring $I'$ over the upper end of the piston without interference caused by the packing rings, or grooves therefor, usually provided at the upper end of the piston.

In the arrangement shown in Figs. 4 and 5 the non-resilient separate cushion is formed by a plurality of cushion devices. Each of these devices comprises a hollow cylinder W closed at its upper end except for the port $W'$ and formed at its lower end with an outturned flange $W^2$. Each cylinder W enters a corresponding socket or well $B^{10}$ formed in the anvil B and is prevented from moving entirely out of the well by a collar $W^6$ bolted to the upper side of the anvil body. The lower end of the cylinder W is closed by a disk $W^3$ which may be separable from the cylinder and is formed with the restricted port $W^4$. A spring $W^5$ acts against the under side of disk W³ and tends to move the latter and the cylinder W up until the flange W² on the latter engages the collar W⁶. A cup leather I¹⁰, ring J³⁰, and bolts J⁵⁰, like the ports I', J³ and J⁵ respectively described in connection with Fig. 1, may be secured to the under side of the disk W⁸ at the margin of the latter to make a tight joint.

In operation, at the beginning of impact the mold support strikes the upper ends of the cylinders W then in their uppermost position, and drives them down. Their downward movement is limited by the rate at which the liquid in which the disks W³ are at all times submerged can flow through the restricted ports W⁴. After impact and before or after the weight of the mold support is taken off the cylinders, depending on the character of springs W⁵, the latter return the cylinders W to their uppermost position. The air trapped in the upper ends of the cylinders W when the mold support engages the cylinders and closes the ports W⁷, is put under pressure, of course, by the depression of the cylinders and may offer a little assistance to the springs in lifting the cylinders W.

Those skilled in the art will understand how to construct apparatus in accordance with the plans suggested which will give the desired cushion effect under the various conditions met with in practice in view of the following suggestions. At the beginning of impact the top wall of the cushion must have a velocity equal to the full velocity acquired by the mold support in falling which is of course a definite and easily determined factor for any given machine and adjustment thereof. The rate of opposition to the flow of the liquid through the restricted escape ports at the instant of impact must not be great enough to create a bursting pressure in the collapsible container. The shape and dimensions of the escape ports for obtaining a given rate of flow under a given pressure can be easily determined in accordance with the well known principles governing the flow of liquids through restricted orifices. The cross section of the containers or the aggregate cross section of the containers, if a plurality of cushion devices are employed as in Figs. 4 and 5, fixes the time interval required to bring the mold support to rest. The larger this cross section the quicker the mold support will be brought to rest and in general the shorter the time interval the better. Preferably it should be only a small fraction of the time required for a rising and falling movement of the anvil. The extent of movement of the mold support after impact decreases when the time interval required to bring it to rest is decreased. In practice the cross sectional area of the container or containers will ordinarily be a compromise between the desire to shorten the time interval required to bring the mold support to rest and the desire to keep the cushion small to thereby economize in space and the cost of manufacture.

The various forms of provisions illustrated for cushioning the mold support on impact may be practically equal in effectiveness, so far as preventing whipping or vibration of the mold support in a purely vertical direction, is concerned. The apparatus shown in Figs. 4 and 5, theoretically considered, is somewhat more effective than the other forms disclosed to check and prevent any tendency of the mold support toward a whipping or vibratory movement about a horizontal axis on impact which otherwise might exist as when the load on the mold support is not centrally disposed and the guiding provisions between the mold support and anvil are not effective to prevent some such tilting movement of the mold support. In practice, the guiding provisions between the mold support and anvil and the manner of loading the mold support are ordinarily such as to make it unnecessary to employ the construction shown in Figs. 4 and 5 in preference to those shown in the other figures in order to avoid tilting movements of the mold support on impact.

While in accordance with the provisions of the statutes I have herein described and illustrated in detail the best forms of my invention now known to me, it will be apparent to those skilled in the art that many changes may be made in the form of the apparatus disclosed without departing from the spirit of the invention, and I do not wish the claims hereinafter made to be limited to the particular apparatus disclosed more than is made necessary by the state of the art.

Having now described my invention, what I claim as new, and desire to secure by Letters Patent, is:

1. In a jar molding machine, the combination with a relatively movable anvil and mold support, of means providing a substantially nonresilient cushion between the anvil and mold support, to take the shock of impact when the anvil and mold support collide.

2. In a jar molding machine, the combination with a relatively movable anvil and mold support, of means comprising a compressible container filled with liquid and having an escape port or ports, through which the liquid may escape at a regulated rate, for providing a cushion between the anvil and the mold support to take the shock of impact when the anvil and mold support collide.

3. In a jar molding machine, the combination with relatively movable mold support and anvil members, of a cushion device carried by one of said members and adapted to be engaged by the other of said members and to receive the shock of impact when the members collide, said device comprising a cylinder having a liquid space, and a piston tending to move relative to the cylinder in a direction to diminish said space on collision of said members, said device having a port or ports through which liquid may escape at a regulated rate to permit such relative movement.

4. In a jar molding machine, the combination with relatively movable mold support and anvil members, of a cushion device carried by one of said members and adapted to be engaged by the other of said members and to receive the shock of impact when the members collide, said device comprising a cylinder having a liquid space, and a piston tending to move relative to the cylinder in a direction to diminish said space on collision of said members, said device having a port or ports through which liquid may escape at a regulated rate to permit such relative movement, and means for expanding the cushion preparatory to impact.

5. In a jar molding machine, the combination with relatively movable mold support and anvil members, of a cushion device carried by one of said members and adapted to be engaged by the other of said members and to receive the shock of impact when the members collide, said device comprising a cylinder having a liquid space, and a piston tending to move relative to the cylinder in a direction to diminish said space on collision of said members, said device having a port or ports through which liquid may escape at a regulated rate to permit such relative movement, and means for insuring the admission of liquid to said space preparatory to impact.

6. In a jar molding machine, the combination with relatively movable mold support and anvil members, of a cushion device carried by one of said members and adapted to be engaged by the other of said members and to receive the shock of impact when the members collide, said device comprising a cylinder having a liquid space, and a piston tending to move relative to the cylinder in a direction to diminish said space on collision of said members, said device having a port or ports through which liquid may escape at a regulated rate to permit such relative movement, a liquid containing reservoir or reservoirs to which said port or ports are connected, and means for forcing liquid from said reservoir into said space preparatory to impact.

7. In a jar molding machine, the combination with relatively movable mold support and anvil members, of a cushion device carried by one of said members and adapted to be engaged by the other of said members and to receive the shock of impact when the members collide, said device comprising a cylinder having a liquid space, and a piston tending to move relative to the cylinder in a direction to diminish said space on collision of said members, said device having a port or ports through which liquid may escape at a regulated rate to permit such relative movement, a reservoir or reservoirs to which said port or ports are connected and containing a body of liquid, the surface of which is above the top of said liquid space and said ports, and resilient means for producing relative movement of the cylinder and piston preparatory to impact to increase said liquid space and cause it to be filled with liquid.

8. In a jar molding machine, the combination with relatively movable mold support and anvil members, of a cushion device carried by one of said members and adapted to be engaged by the other of said members and to receive the shock of impact when the members collide, said cushion comprising a cylinder having a liquid space, and a piston tending to move relative to the cylinder in a direction to diminish said space on collision of said members, said device having a port or ports through which liquid may escape at a regulated rate to permit such relative movement, a reservoir or reservoirs to which said port or ports are connected, means for maintaining a body of liquid in said reservoir under pressure sufficient to quickly fill said space when the parts are put into impact receiving condition, and resilient means for causing the piston and cylinder to move into the impact receiving condition preparatory to each impact.

9. In a jar molding machine, an anvil member provided with an upstanding piston guide for a mold support and a cylindrical shoulder at the base of said piston, a cylinder open at its lower end fitting on said shoulder and having a closed upper end apertured to receive said piston, a mold support having a cylindrical bearing for said piston and adapted to impinge on said cylinder, said anvil being provided with a reservoir space or spaces for a liquid and having said spaces connected to the space in said cylinder above said shoulder by restricted ports, means for limiting the movement of said cylinder away from said shoulder, and means for lifting said cylinder and filling the space therein with liquid from said reservoir space or spaces preparatory to impact.

10. In a jar molding machine, the combination of an anvil, a mold support adapted to be lifted above and allowed to fall back into collision with said anvil, resilient means retarding the falling movement of the mold support throughout its falling movement, and means providing a substantially non-resilient cushion between the anvil and mold support to take the shock of impact when the anvil and mold support collide.

11. In a device of the class described, a support, means for raising the support and permitting it to drop, and means to prevent the support from whipping or vibrating on the drop thereof.

12. In a device of the class described, a support, means for raising the support and permitting it to drop, means to receive the impact of the support and to prevent the same from whipping on the drop thereof.

13. In a device of the class described, a base, a table, means for raising the table and permitting it to drop, and impact on the base, and means to prevent the table from whipping upon the impact.

14. In a ramming device, the combination of a support, means to jar the support, and means independent of said first-named means to cushion the rebound upon impact.

15. In a device of the class described, a base, a table mounted on said base, means for raising the table and permitting it to drop, and fluid dashes between the table and base to take up the impact and prevent the table from whipping and vibrating upon the fall thereof.

WILFRED LEWIS.

Witnesses:
 ARNOLD KATZ,
 S. STEWART.